United States Patent [19]

Tazartes et al.

[11] Patent Number: 5,004,344

[45] Date of Patent: * Apr. 2, 1991

[54] APPARATUS AND METHOD FOR CORRECTING RING LASER GYROSCOPE PHASE ERRORS AT TURNAROUND

[75] Inventors: Daniel A. Tazartes, West Hills; John G. Mark, Pasadena; Anthony Mathews, Calabassas, all of Calif.

[73] Assignee: Litton Systems, Inc., Beverly Hills, Calif.

[*] Notice: The portion of the term of this patent subsequent to Oct. 24, 2006 has been disclaimed.

[21] Appl. No.: 405,515

[22] Filed: Sep. 11, 1989

Related U.S. Application Data

[63] Continuation-in-part of Ser. No. 189,047, May 2, 1988, Pat. No. 4,875,774.

[51] Int. Cl.[5] .............................................. G01B 9/02
[52] U.S. Cl. ............................................... 356/350
[58] Field of Search ................................... 356/350

[56] References Cited

U.S. PATENT DOCUMENTS 4,648,716 3/1987 Egli .............................. 356/350
4,875,774 10/1989 Tazartes et al. ............... 356/350

Primary Examiner—Linda J. Wallace
Attorney, Agent, or Firm—Lynn & Lynn

[57] ABSTRACT

Digitized heterodyne signals in a ring laser gyroscope are processed to determine the phase and acceleration of heterodyne signals at turnarounds in the angular motion of the frame of the ring laser. A hybrid analog/digital design that incorporates the necessary logic processes the turnaround data to produce a phase correction that can be added to the gyroscope count to correct phase errors that at each turnaround. Separation of high speed data processing from lower rate data simplifies the code and permits evaluation of turnaround correction performance. A fully digital system determines a phase distribution for the detected turnarounds and processes the phase distributions of the heterodyne signals for a multiplicity of turnarounds to determine an angle towards which the phase distributions are skewed and the amount of that skew. A phase correction is then calculated to compensate for turnaround-induced errors in measurements of phase differences between the two beams as a function of the skew angle and the amount of skew of the phase distribution.

22 Claims, 12 Drawing Sheets

```
TALOGIC:  ! ----- TURN AROUND LOGIC SUBROUTINE -----
2270     !      CALLED ON ALL HET TRANSITION
2280     !      WRITTEN 10/09/86
2290     !
2300     !   CCW        DIRECTION (CCW ==> 1)
2310     !   CCWOLD     PREVIOUS DIRECTION
2320     !   TP         TIMER POINTER
2330     !   CCWTOCW    INCOMING DIRECTION (EQUIVALENT TO T/A DIRECTION)
2340     !   T (*)      TIMERS
2350     !   G(*)       TIMER GATES (COUNT ENABLE)
2360     !   QA         OUTGOING HET A VALUE
2370     !   QB         OUTGOING HET B VALUE
2380     !
2390     ! LATCHES:  TL (*)   TIMER LATCHES
2400     !   TPL        TIMER POINTER LATCH (POINTS TO T2)
2410     !   QL         OUTGOING QUADRANT LATCH (2 BITS)
2420     !   CCWTOCWL   INCOMING DIRECTION LATCH
2430     !   INHIBIT    INHIBIT LATCHES UNTIL COMPUTER READS
                                    PREVIOUS DATA
2440     !
2450     IF CCW = CCWOLD THEN       ! NOT A TURN-AROUND
2460     TP = NOT TP                ! TOGGLE TIMER POINTER
2470     IF NOT CCWTOCW THEN        ! PREVIOUS T/A COMPLETE
2480     IF NOT INHIBIT THEN        ! LATCH VALUES FOR COMPUTER
2490     TL (0) = T (0)
2500     TL (1) = T (1)
2510     TPL = TP
2520     Q1 = 2 * NOT QB + BINEOR (QA, QB)
2530     CCWTOCWL = CCWTOCW
2540     INHIBIT = 1                ! SET LATCH INHIBIT
2550     END IF
2560     CALL CORRECTION (TL (*), TPL, Q1, CCWTOCWL) ! DATA READY
                                                     FOR COMPUTER
2570     INHIBIT = 0                ! COMPUTER RESETS INHIBIT
2580     END IF
2590     T (TP) = 0                 ! RESET SELECTED COUNTER
2600     G (TP) = 1                 ! GATE SELECTED COUNTER ON
2610     CCWTOCW = CCW              ! SAVE ROTATION DIRECTION
2620     ELSE                       ! THIS IS A TURN-AROUND
2630     G (TP) = NOT G (TP)        ! TOGGLE CURRENT TIMER GATE
2640     QA = SHA                   ! SAVE HET A
2650     QB = SHB                   ! SAVE HET B
2660     END IF
2670     RETURN
```

FIG. 13B

```
2320  TALOGIC: ! ---- TURN AROUND LOGIC SUBROUTINE ------
2330  !              CALLED ON ALL HET TRANSITIONS
2340  !                 T1, T2-T1 MECHANIZATION
2350  !                     WRITTEN 10/28/86
2360  !
2370  ! CCW DIRECTION (CCW ==> 1)
2380  ! CCWOLD          PREVIOUS DIRECTION
2390  ! TP              TIMER POINTER
2400  ! CCWTOCW         INCOMING DIRECTION (EQUIVALENT TO T/A DIRECTION)
2410  ! T (*)           TIMERS
2420  ! G (*)           TIMER GATES (COUNT ENABLE)
2430  ! QA              OUTGOING HET A VALUE
2440  ! QB              OUTGOING HET B VALUE
2450  !
2460  ! LATCHES: L (*)  ADDRESS LATCHES
2470  !    ADR          ADDRESS (ENABLED LATCH)
2480  !    TPL          TIMER POINTER LATCH (POINTS TO T2-T1)
2490  !    DQ           DIRECTION/OUTGOING QUADRANT LATCH (3 BITS)
2500  !    INHIBIT      INHIBIT LATCHES UNTIL COMPUTER READS PREVIOUS
                        DATA
2510  !
2520  IF   CCW = CCWOLD THEN                  ! NOT A TURN-AROUND
2530  TP = NOT TP                             ! TOGGLE TIMER POINTER
2540  IF CCW = NOT CCWTOCW THEN               ! PREVIOUS T/A COMPLETE
2550     IF NOT INHIBIT THEN                  ! LATCH DATA
2560        TPL = TP                          ! LATCH COUNTER SELECT
2570        L(0) - (INT (T (0)/32) MOD 128*64+INT (T(1)/64 MOD 64) *2
2580        L(1) - (INT (T (1)/32) MOD 128*64+INT (T(0)/64 MOD 64) *2
2590        ADR=L (TPL)                       ! ENABLE LATCH OUTPUT
2600        DQ=4*CCWTOCW+2*NOT QB+BINEOR (QA,QB) ! LATCH DIR/QUAD
2610        INHIBIT = 1                       ! SET LATCH INHIBIT
2620     END IF
2630     CALL ILKUPCORR(ADR,DQ)               ! DATA TO COMPUTER
2640     INHIBIT = 0                          ! COMPUTER RESETS INHIBIT
2650        END IF
2660        T (TP) = 0                        ! RESET SELECTED COUNTER
2670        G (TP) = 1                        ! GATE SELECTED COUNTER ON
2680        G (NOT TP) = 0                    ! OTHER GATE COMPLEMENTARY
2690        CCWTOCW =CCW                      ! SAVE ROTATION DIRECTION
2700     ELSE                                 ! THIS IS A TURN-AROUND
2710        G (0) = NOT G (0)                 ! TOGGLE TIMER GATES
2720        G (1) = NOT G (1)
2730        QA = SHA                          ! SAVE HET A
2740        QB = SHB                          ! SAVE HET B
2750     END IF
2760     RETURN
```

*FIG. 14B*

APPARATUS AND METHOD FOR CORRECTING RING LASER GYROSCOPE PHASE ERRORS AT TURNAROUND

This application is a continuation in part of copending U.S. patent application Ser. No. 189,047, now U.S. Pat. No. 4,875,774, filed May 2, 1988.

BACKGROUND OF THE INVENTION

This invention relates generally to rotation sensors and particularly to ring laser gyroscope rotation sensors. Still more particularly, this invention relates to apparatus and methods for determining the heterodyne phase and acceleration in a body dithered ring laser gyroscope at turnaround and using these signals to calculate a turnaround phase correction.

A ring laser gyroscope employs the Sagnac effect to detect rotation. Counter propagating light beams in a closed loop will have transit times that differ in direct proportion to the rotation rate of the loop about an axis perpendicular to the plane of the loop. The ring laser gyroscope uses the resonant properties of a closed cavity to convert the Sagnac phase difference between the counter propagating beams into a frequency difference. In an active ring laser gyroscope the cavity defined by the closed optical path becomes an oscillator, and output beams from the two directions interfere to give a beat frequency that is a measure of the rotation rate. The high optical frequencies of about $10^{15}$ Hz for light used in ring laser When the rotation rate of a ring laser gyroscope is within a certain range, the frequency difference between the beams disappears. This phenomenon is called frequency lock-in, or mode locking, and is a major difficulty with the ring laser gyroscope because at low rotation rates it causes a false indication that the device is not rotating. The range of rotation rates over which lock-in occurs is the deadband of the ring laser gyroscope.

Lock-in arises from coupling of light between the beams. The coupling results primarily from backscatter off the mirrors that confine the beams to the closed path. Backscatter causes the beam in each direction to include a small component having the frequency of the beam propagating in the other direction. The lock-in effect in a ring laser gyroscope is similar to the coupling that has been long been observed and understood in conventional electronic oscillators.

Any inability to accurately measure low rotation rates reduces the effectiveness of a ring laser gyroscope in a navigational system. There has been a substantial amount of research and development work to reduce or eliminate the effects of lock-in and to enhance the effective use of ring laser gyroscopes in such systems.

There are several known approaches to solving the problems of lock-in. Various biasing techniques have been employed to avoid the dead band so that lock-in would not be a problem in ring laser gyroscope operation. Biasing techniques can be divided into mechanical and optical techniques and into fixed and dithered bias techniques.

One approach involves mechanically oscillating the ring laser gyroscope about its sensor axis so that the device is constantly sweeping through the deadband. This mechanical oscillation of the ring laser gyroscope is usually called dithering. A typical ring laser gyroscope may be dithered at about 400 Hz with an angular displacement of a few arc minutes.

The amplitude of the dithering must be carefully controlled and monitored to minimize the effects of lock-in. Since the dither oscillation angular velocity and displacement relative to a support structure can be constantly monitored, they may be excluded from the output signal of the ring laser gyroscope. However, it has been found that a constant dithering amplitude is inadequate to eliminate all of the effects of lock-in.

One approach to reducing lock-in error is to superimpose a random signal upon the amplitude of the dither driving amplifier. A random bias technique is described in U.S. Pat. No. 3,467,472. Several rather severe disadvantages to the random bias technique have been found, however. The phase error, even though randomized by the technique described in this patent, is not eliminated and still remains a relatively large source of error.

When the sign of the frequency difference reverses, the two beams tend to lock-in since at some point the frequency difference between the beams is zero. Since the output angle of the ring laser gyroscope is generally derived from the frequency difference, which locks in to indicate a zero rotation rate even if the actual rotation rate is non-zero, an error accumulates in the output angle. The periods of time when the two beams are locked in are usually very short so that the resulting output angle error is very small for any single sign change. Nevertheless, the error resulting from lock-in during sign reversal of the frequency difference is cumulative, and in time may become significant, particularly in precision navigational systems. This error is usually the major contributor to the random walk or random drift.

U.S. Pat. No. 4,529,311 to Morgan et al. is directed to a ring laser gyros system in which the phase relationship between a pair of beams is accounted for. This phase may be used in a feedback loop for error control or it may be utilized to generate a set of error parameters for error correction. Morgan et al. regards the phase offset and the coupling efficiency of the two beams as being independent of time and temperature. However, the phase offset and the beam coupling efficiency are time and temperature dependent, which limits the accuracy of the error correction disclosed in Morgan et al.

U.S. Pat. No. 4,248,534 to Elbert is directed to the elimination of errors induced in dithered ring laser gyroscopes. Elbert discloses the use of a regression algorithm for minimizing lock-in. For a short time on both sides of zero velocity a trace of the rotation rate is stored in a computer memory. When there is no lock-in, this trace is a parabola. Deviations from the parabola are indicative of the lock-in rate.

U.S. Pat. No. 4,473,297 to Simpson et al. is directed to the use of phase differences between the alternating components in the counterpropagating beams to minimize lockin in a ring laser gyroscope. Signals indicative of the phase difference in the separate beams are input to a mirror driver circuit that drives two cavity length control mirrors to control the phase difference. Simpson et al discloses that the preferred phase difference between the beams for minimum lock-in is 180°.

SUMMARY OF THE INVENTION

The present invention is a system for compensating for turnaround phase errors in measurements of rotations with a dithered ring laser gyroscope that includes a frame having a cavity therein for guiding a pair of counterpropagating light beams. The ring laser gyroscope also includes means for producing a pair of heterodyne signals that are processed to determine an angle of rotation.

A system according to the present invention for compensating for turnaround phase errors in measurements of rotations with a dithered ring laser gyroscope that includes a frame having a cavity therein for guiding a pair of counterpropagating light beams and means for producing a pair of heterodyne signals that are processed to determine an angle of rotation may comprise means for determining the direction of rotation of the frame and means for detecting turnarounds in direction of rotation of the frame. The invention may further include means for determining the heterodyne phase and the heterodyne phase acceleration at turnaround. The invention may also include means for determining the amplitude and phase of backscattered light in the cavity and means for calculating a phase correction to compensate for turnaround-induced errors in measurements of phase differences between the two beams as a function of the heterodyne phase and acceleration at turnaround and as a function of the amplitude and phase of the backscattered light in the cavity.

The dominant source of random walk in a dithered gyroscope is generally backscatter induced errors occurring at every "turnaround". The ring laser gyroscope phase error accumulated during turnarounds can be related to several gyroscope observables. The error at each turnaround may be calculated using the equation:

$$\psi = -D\sqrt{\frac{2\pi}{|a_o|}} \sin\left(\psi_o + \phi \pm \frac{\pi}{4}\right),$$

where $D$=backscatter magnitude, $a_o$=het phase acceleration at turnaround, $\psi_o$=het phase at turnaround and $\phi$=backscatter phase.

By appropriately detecting gyroscope turnarounds and by forming a phase correction, the backscatter induced random walk in a dithered ring laser gyroscope can be substantially reduced. One embodiment of the invention comprises two sections. The first involves processing the heterodyne detector signals to derive turnaround phase and acceleration. This processing should be executed at every turnaround. The second portion involves analog circuitry that derives the backscatter magnitude and the lock-in phase of the gyro from the AC intensity sum. These latter two parameters are slowly varying and the related processing may be executed at a much lower rate.

The present invention may comprise a system for determining the heterodyne phase and acceleration at turnaround in a body dithered ring laser gyroscope by using the digitized heterodyne signals therefrom. The digitized signals are used to calculate the turnaround phase correction to be added or subtracted from the detected ring laser gyroscope phase. This invention includes a digital logic scheme for extracting the desired parameters from the heterodyne signals. Protection schemes are included for multiple heterodyne transitions and false turnarounds.

The present invention may also include means for completely decoupling the high speed computation from the lower rate processing. This decoupling or separation permits the correction to be formulated and applied without requiring excessive amounts of computer duty cycle. It also permits the use of either a computation intensive or memory intensive mechanization. Additionally, this decoupling permits a calibration of the analog circuitry and establishes performance limits for the turnaround correction.

The system of the present invention may include means for distinguishing the heterodyne signal transition, determining the direction of rotation of the ring laser gyroscope, means for determining the heterodyne phase and acceleration, and means for determining the turnaround induced phase correction to be added or subtracted from a detected ring laser gyroscope phase. The logic circuitry is preferably configured to include means for determining if a currently measured heterodyne signal is opposite in direction from an incoming heterodyne signal.

The system of the claimed invention may further comprise means for depicting the gyro phase at turnaround as a parabola and dividing it into a turnaround quadrant and an ingoing/outgoing semicircle. A first time period is measured in the turnaround quadrant, and a second time period measured in the semicircle. The phase error introduced at each turnaround is calculated from the two time intervals.

The system of the claimed invention may further include a first and second counting means and means for toggling an enable of the first and second counting means if a change in direction has been detected. The counting means detects the first and second time periods. Storage means saves the output quadrant of the parabola when a change in direction has been detected. The system includes means for returning to the transition detecting means after the outgoing quadrant of the parabola has been saved. The system further comprises means for selecting a counting means and a means for toggling the counter selecting means if there is no change in direction of rotation.

The system may further includes means for latching the difference between the second time period and the first time period if the direction of the incoming heterodyne signal is opposite that of the currently measured heterodyne, and means for signalling the processor that data has been latched if the incoming direction is opposite the current direction.

The system comprises a plurality of counters, means for resetting and enabling selected counters and means for disabling counters not selected by the counter selecting means if the incoming direction is opposite the current direction or the processor has been signalled to latch data, means for saving the current direction as "incoming direction" after the above means has occurred, and means for returning to the means for determining a transition in the heterodyne signal.

The hybrid analog/digital embodiment of the invention preferably includes an indexed look-up table that provides turnaround acceleration measurements and the inverse square root of the turnaround acceleration measurements. This embodiment of the invention includes a cosine/sine look-up table and a outgoing quadrant identifier. The invention also includes means for constructing the square of the second time period minus the square of the first time period and means for using this value to index the look-up table that provides turnaround acceleration and inverse square root acceleration measurements. The turnaround acceleration and the square of the first time period are used to form a penetration phase that may be used as an index to the cosine/sine look-up table. If necessary, the sign of the term for negative acceleration is corrected as indicated by the turnaround direction. The quadrant information is restored using the outgoing quadrant identifier and the cosine and sine terms multiplied by the inverse square root of the turnaround acceleration.

The method of the present invention may include the steps of detecting the heterodyne signals produced by the two counterpropagating light beams within the ring laser gyroscope, and sampling the detected heterodyne signals at an appropriate rate.

The method of the invention may comprise the steps of detecting a transition in a heterodyne signal that triggers the start of a turnaround measuring cycle, detecting a change in direction of the dithering ring laser gyroscope, and determining if a currently measured heterodyne signal is opposite in direction from an incoming heterodyne signal.

The method may also include the steps of depicting a digitized heterodyne signal as a parabola and dividing it into a turnaround quadrant and semicircle, providing a first time period measured in the turnaround quadrant and providing a second time period measured in the turnaround semicircle. The method may further include the step of calculating the phase error introduced at each turnaround as a function of the two time periods.

The method of the claimed invention further comprises the step of providing a first and second counting means each having an enable, toggling the enable of the first and second counting means if a change in direction has been detected, the counting means detecting a first and a second time period, saving the output quadrant of the parabola when a change in direction has been detected, and returning to the transition detecting means after the outgoing quadrant of the parabola has been saved.

The method may further comprise the steps of latching the difference between the second time period and the first time period if the direction of the incoming heterodyne signal is opposite that of the currently measured heterodyne, and signalling the processor that data has been latched if the incoming direction is opposite the current direction.

The method may also include the step of providing a plurality of counter means, resetting and enabling selected counter means and means for disabling counters not selected by the counter selecting means if the ingoing direction is opposite the current direction saving the current direction as "incoming direction" after the above means has occurred, and returning to the means for determining a transition in the heterodyne signal.

A digital system for compensating for turnaround phase errors in measurements of rotations with a dithered ring laser gyroscope comprises means for detecting turnarounds in the direction of rotation of the frame and determining a phase distribution for the detected turnarounds. The digital system may also include means for processing the phase distributions of the heterodyne signals for a multiplicity of turnarounds in the direction of rotation of the frame to determine a drift rate at which the phase distributions are skewed toward a particular angle. The digital system also includes means for calculating a phase correction to compensate for turnaround-induced errors in measurements of phase differences between the two beams as a function of the drift rate and the angles toward which the phase distribution is skewed.

The digital system of claim may further include means for digitizing the heterodyne signals, means for measuring the times between positive and negative transitions in the heterodyne signals, means for dividing the 0°-360° range of possible turnaround angles into a predetermined number of angular intervals; and counting the number of turnarounds that occur in each interval.

BRIEF DESCRIPTION OF THE DRAWINGS

FIG. 13B is a computer program listing for one implementation of the flow chart of FIG. 13A;

FIG. 14B is a computer program listing for one implementation of the flow chart of FIG. 14A.

DESCRIPTION OF THE PREFERRED EMBODIMENT

Figure 1:
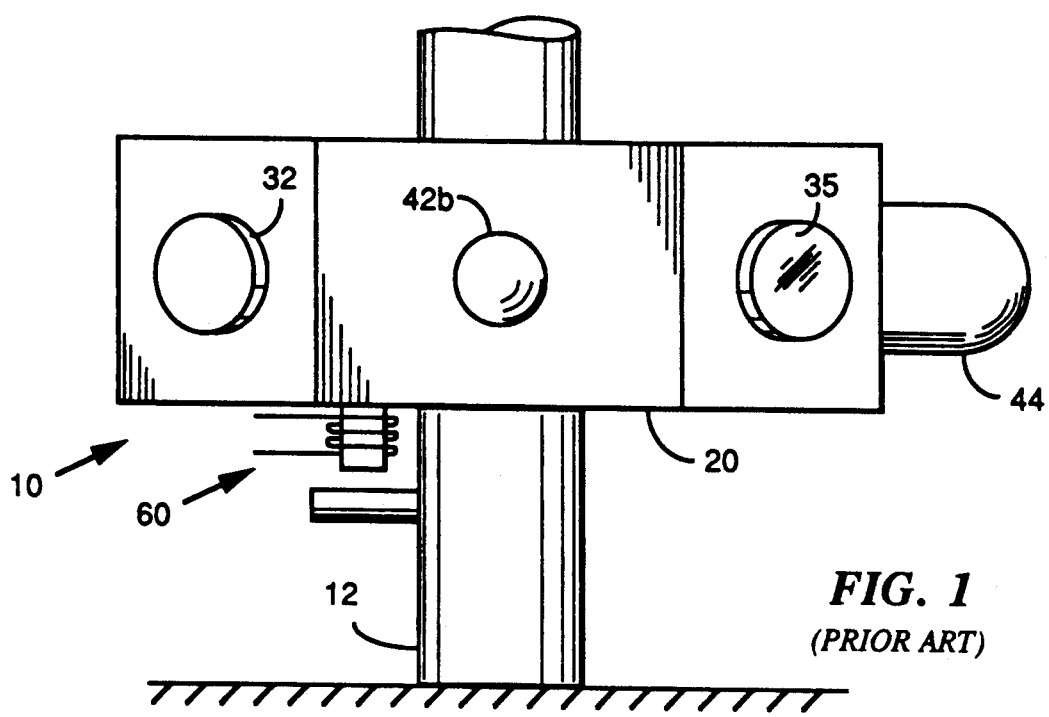
FIG. 1 is a perspective view of a ring laser gyroscope mounted upon a supporting structure.
Figure 2:
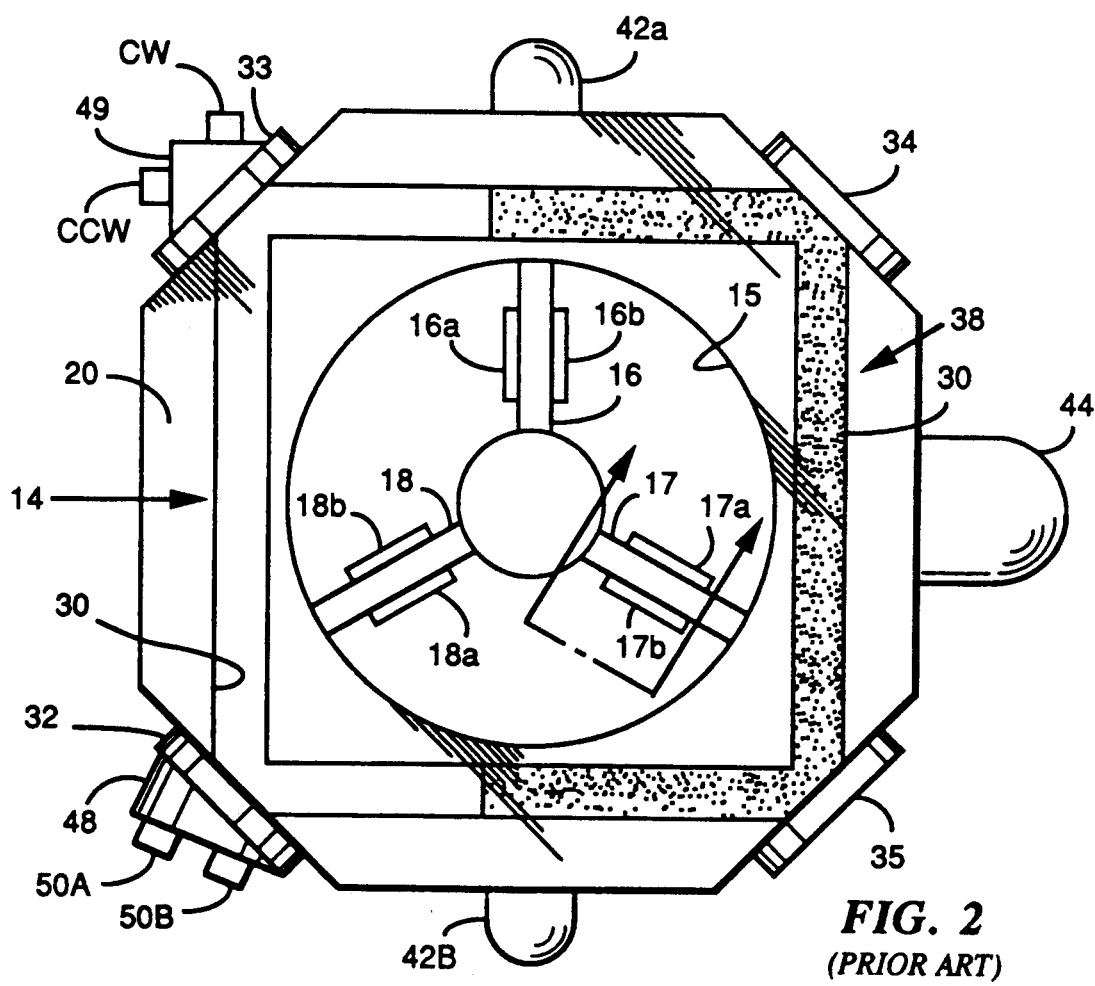
FIG. 2 is a plan view of the ring laser gyroscope of FIG. 1.

Referring to FIGS. 1 and 2, a ring laser gyroscope 10 is mounted on a support 12. The ring laser gyroscope 10 is exemplary of many such devices with which the present invention may be practiced and does not limit the present invention to the particular embodiment of the ring laser gyroscope 10 shown in FIGS. 1 and 2 and described herein.

The ring laser gyroscope 10 is supported by a flexure mechanism 14 mounted in a central hole 15 in the frame. The flexure mechanism 14 may comprise a plurality of springs 16-18 connected between a frame 20 and the support 12. The illustrated embodiment includes three springs, but the invention may be practiced with any number of springs. Referring to FIG. 2, the springs 16-18 may be formed as thin rectangles, but the present invention is not limited in its applicability to springs having such configurations.

Referring to FIG. 2, a pair of piezoelectric wafers 16A, 16B, 17A, 17B, 18A and 18B are mounted on the springs 16-18, respectively. All of the spring and wafer combinations are essentially the same; therefore, only spring 16 and piezoelectric wafers 16A and 16B are described herein. The piezoelectric wafers 16A and 16B have generally rectangular configurations and are mounted on the opposite side of the spring 16. The piezoelectric wafers 16A and 16B preferably are mounted to the spring 16 by a suitable bonding agent.

The piezoelectric wafer 16A is poled such that application of a driving voltage across it causes the piezoelectric wafer 16A to selectively expand or contract. The piezoelectric wafer 16B is also poled and has a pair of opposing electrodes 26 and 28 connected thereto. The piezoelectric wafers 16A and 16B may have opposite polarities so that application of the same driving signal thereto causes one wafer, for example wafer 16A, to expand while the other wafer 16B contracts. If the wafers 16A and 16B have the same polarities, then the driving voltages must have opposite polarities in order to achieve the desired effect of alternately expanding and contracting. The piezoelectric wafers 17A, 17B, 18A and 18B have polarities and driving voltages substantially identical to the piezoelectric wafers 16A and 16B, respectively. Therefore if the piezoelectric wafers 16A, 17A and 18A contract while the piezoelectric wafer 16B, 17B and 18B expand, the springs 16, 17 and 18 will deform so that the frame 20 rotates clockwise about the support 12. A change in sign of the driving voltage causes a counterclockwise rotation of the frame 20 about the support 12.

Referring to FIG. 2, a cavity 30 formed in the frame 20 extends between a plurality of mirrors 32-35, which guide light around a closed path inside the cavity 30. A gain medium 38 is confined inside the cavity 30. The gain medium is typically comprised of a mixture of helium and neon gases. Application of an excitation voltage to a pair of anodes 42a and 42b and a cathode 44 causes energy level transitions in the gas mixture, as is well-known, to produce counterpropagating coherent light beams in the cavity 30.

The two counterpropagating beams undergo a rotation induced phase shift in circulating around the cavity 30 by successive reflection from the mirrors 32-35 as the cavity 30 rotates about its longitudinal axis. The rate of change of the difference in the phase of the two counterpropagating beams is indicative of the rotation rate of the ring laser gyroscope 10 about its longitudinal axis. Since the cavity 30 acts as a resonant cavity to the two beams, the frequency of each beam is sharply defined so that the phase shift changes are detectable.

One of the mirrors, for example the mirror 32, is partly transmissive so that a portion of each beam enters a prism 48 mounted to the back of the mirror 32. The prism 48 is formed to combine, or heterodyne, the counterpropagating beams so that they interfere with one another before impinging upon a pair of photodetectors 50A and 50B.

Figure 3A:
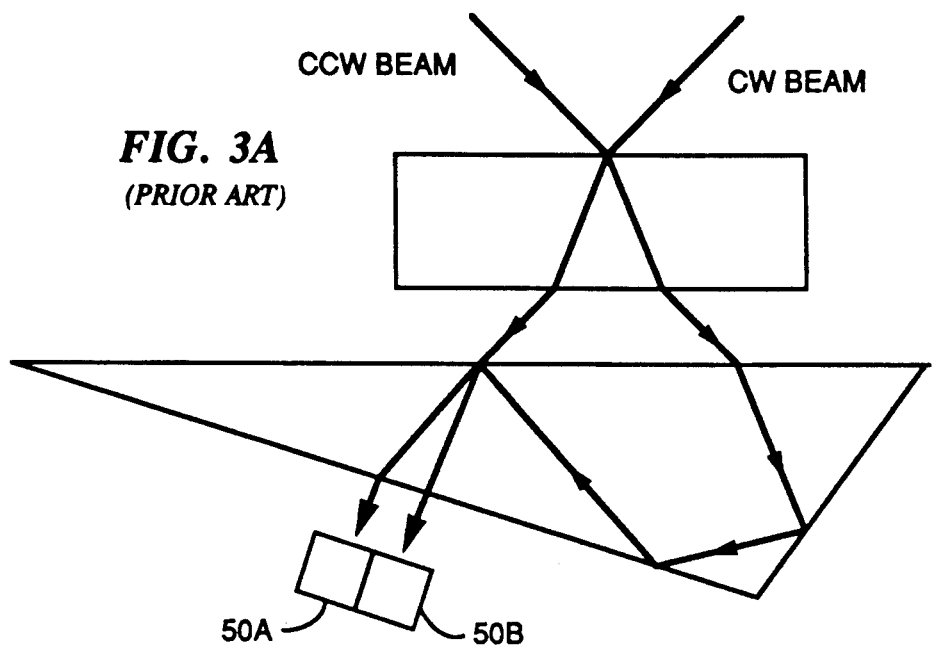
FIGS. 3A and 3B illustrate formation of heterodyne signal outputs from the ring laser gyroscope of FIGS. 1 and 2.
Figure 3B:

FIG. 3A illustrates a detailed view of the transmissive mirror 32 and the combining prism 48. Part of each of the clockwise and counterclockwise beams travels through the mirror 32 and impinges upon the prism 48. The prism angles and the prism orientation cooperate, causing internal reflections of one of the beams so that the beams are essentially parallel when they emerge from the prism 48. The electromagnetic fields of the beams thus add together to form an interference pattern of bright and dark fringes as shown in FIG. 3B. A pair of photodetectors 50A and 50B detect the intensity of the combined beams. The outputs of the detectors are referenced herein as heterodyne signal A, or Het A and heterodyne signal B, or Het B, respectively. A frequency difference between the clockwise beam and the counterclockwise beam caused by rotation of the gyro will be seen as motion of the interference pattern across the detectors 50A and 50B Accordingly, the direction of motion of the fringes identifies the direction of rotation. Each full cycle of the interference pattern corresponds to $2\pi$ radians of phase, or a cycle of the beat frequency, and therefore corresponds to a fixed angular rotation increment. Each occurrence of a full cycle of the interference pattern generates a signal called a heterodyne count. For a ring laser gyroscope 10 having a 28 cm path length, the scale factor is about 1.8 arc seconds of rotation per heterodyne count.

Figure 4:
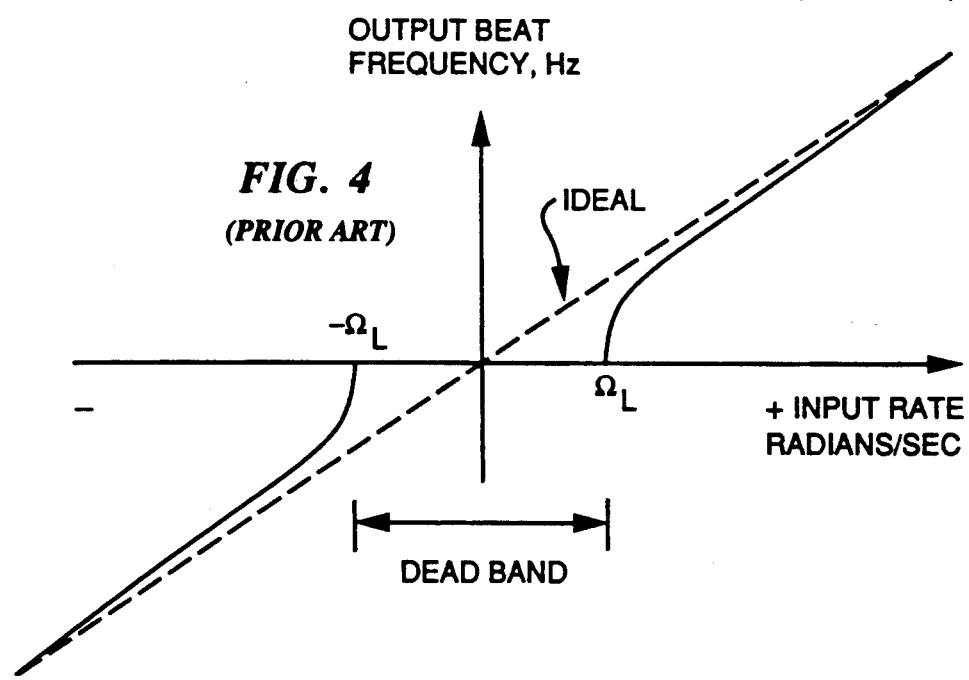
FIG. 4 graphically illustrates the output beat frequency of a ring laser gyroscope as a function of rotation rate.

The frequency of the beat signal produced when the two frequencies heterodyne at the detectors 50A and 50B is directly proportional to the rotation rate of the ring laser gyroscope 10 about its longitudinal axis. Referring to FIG. 4, when the rotation rate of a simple, unbiased ring laser gyroscope 10 is reduced to the lock-in threshold rate $\psi_L$, the counterpropagating beams lock at the same frequency. The frequencies of the counterpropagating beams are the same for a range of rotation rates $\pm\psi_L$, which is the lock-in deadband shown in FIG. 4. The signal output from the ring laser gyroscope 10 becomes non-linear in the vicinity of the deadband, which is a departure from the output of an ideal ring laser gyroscope.

Figure 5:
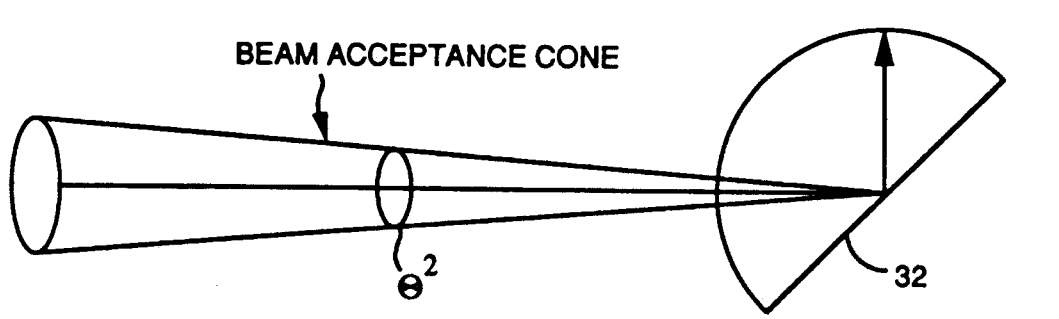
FIG. 5 illustrates forward reflected and backscattered light from a mirror of the type that may be included in the ring laser gyroscope of FIG. 1.
Figure 7:
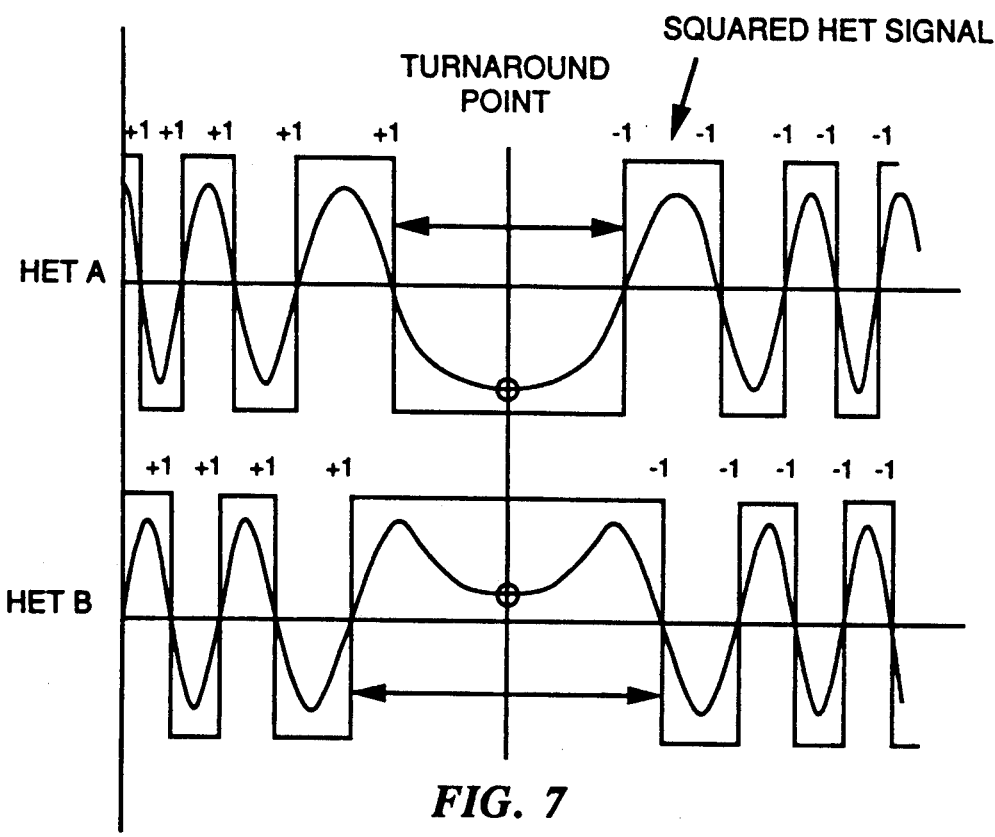
FIG. 7 illustrates analog and digital signals representative of the outputs of two heterodyne photodetectors included in the ring laser gyroscope of FIG. 1 just before and just after a turnaround in the dither motion.

Referring to FIG. 5, lock-in is caused primarily by radiation backscattered from the mirrors 32-35. Since the counterpropagating beams strike each of the mirrors 32-35 at an angle of incidence of 45°, there would be no backscattered radiation from ideal, perfectly flat mirrors. The main portion of each beam is forward reflected from the mirror 32, for example, according to the laws of reflection. However, even though the mirrors 32-35 are of very high quality, surface imperfections cause some specular reflection of each beam in all directions. Light from one beam that is backscattered into an acceptance solid angle for the oppositely directed beam couples thereto. The acceptance solid angle depends upon the wavelength of the light and the diameter of the cavity 30. For a typical square ring laser gyroscope 10 having a 45° angle of incidence, about one part in $10^6$ of the total specular reflection from any one of the mirrors 32-35 is scattered into the acceptance angle of the counterpropagating beam.

Figure 6A:
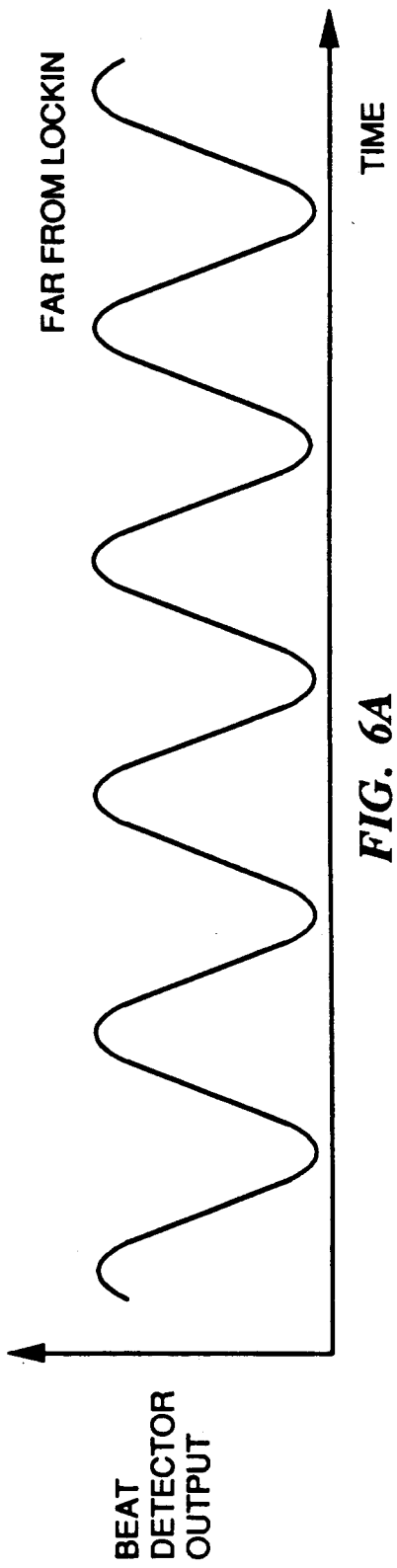
FIGS. 6A and 6B illustrate the output waveform of the ring laser gyroscope of FIG. 1 for rotation rates far from the lock-in threshold and near the lock-in threshold, respectively.
Figure 6B:
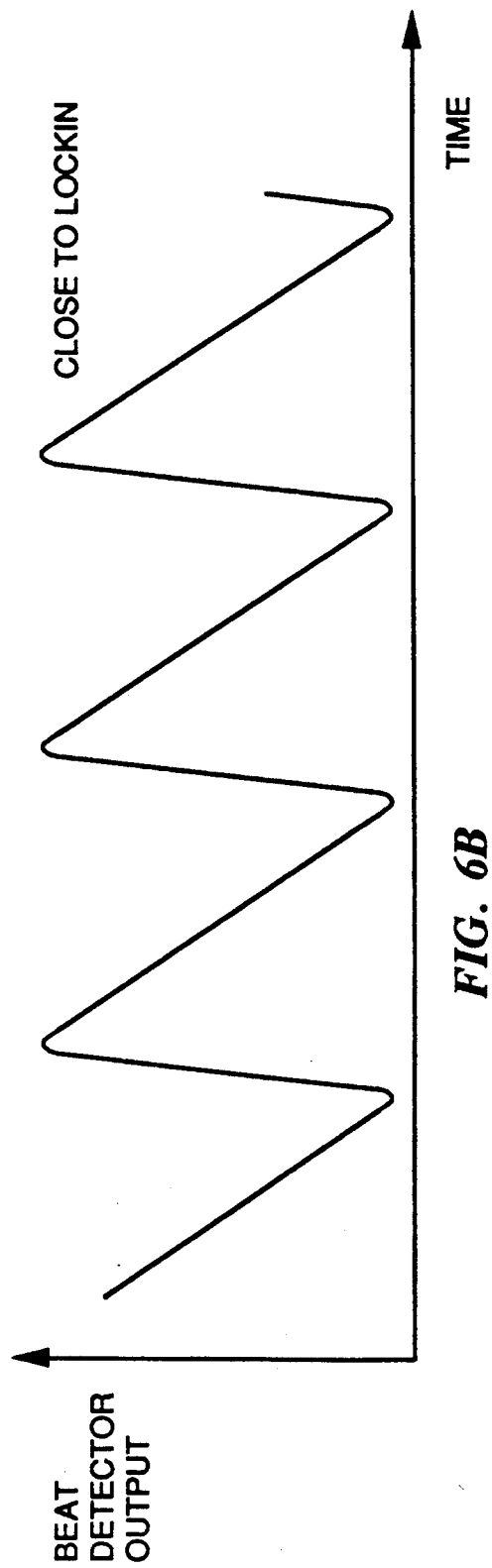

Referring to FIG. 6A, the output of the detector 50 as a function of time is sinusoidal when the rotation rate is far from the lock-in threshold. Referring to FIG. 6B, when the rotation rate is near the lock-in threshold, the output of the detector 50 is distorted from the desired sinusoidal waveform. For a typical ring laser gyroscope having a cavity length of 28 cm, the lock-in threshold is about 100°/hr. Therefore, obtaining satisfactory results from the ring laser gyroscope 10 requires avoidance not only of lock-in but also avoidance of the rotation rates near the deadband.

Even with dither the residual effects of coupling between the counter propagating beams are not negligible. For low rotation rates an error arises in the ring laser gyroscope 10 at points of reversal of the direction of the dither oscillations. This error, while random, is a major source of error in ring laser rotation sensors. The nature of the residual lock-in error is white noise in angle rate leading to a random walk in the output angle of the ring laser gyro. Random walk is parameterized by the laser gyro random walk coefficient. The mathematical relationship between the lock-in coefficient, the dither parameters, and the random walk coefficient is derived by Hammons and Ashby, "Mechanically Dithered RLG at the Quantum Limit", IEEE NAECON 1978, which is hereby incorporated by reference into the present disclosure.

Figure 8:
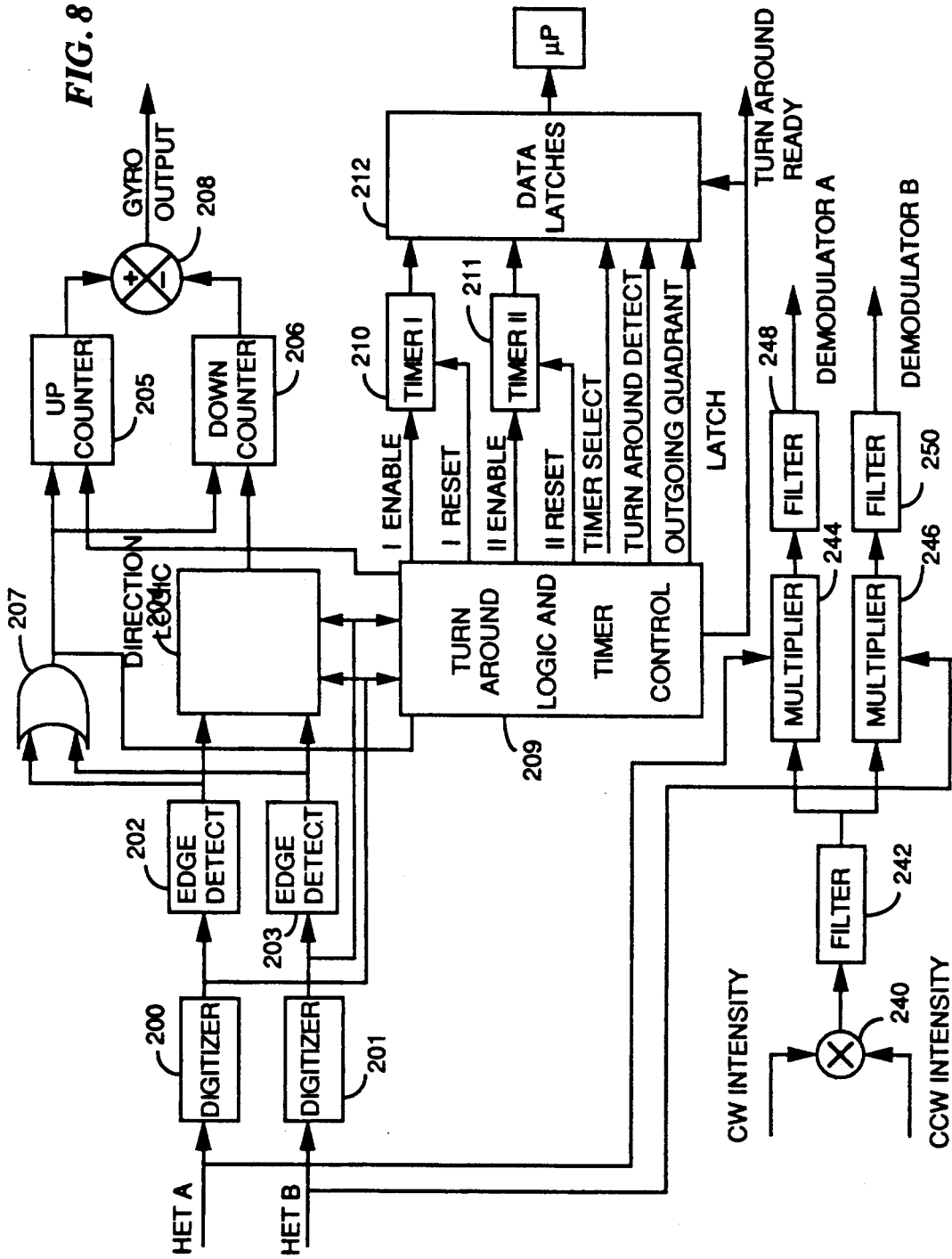
FIG. 8 is a block diagram of circuitry that may be used in the present invention to produce signals for determining the rotation rate and turnaround error correction of the ring laser gyroscope of FIG. 1.

FIG. 8 is a block diagram of circuitry for collecting gyro data and processing gyro turnarounds. The Het A and Het B signals of FIG. 3 are input to digitizing circuits 200 and 201, respectively. The digitizing circuits 200 and 201 convert the analog data input into standard digital waveforms. Edge detectors 202 and 203 are connected to the digitizers 200 and 201, respectively. One of the edge detectors 202 and 203 outputs a pulse whenever the digital waveform toggles states. The outputs of the edge detectors 202 and 203 are input to an OR gate 207 and to a direction logic circuit 204. The output of the OR gate 207 is input to the turn around logic and timer control circuit 209, to the up counter 205 and to the down counter 206. The up counter 205 and the down counter 206 also receive inputs from the direction logic circuit 204.

The direction logic block 204 analyzes the state transitions of the Het A and Het B signals to determine the current direction of gyro rotation. Depending on the direction of rotation, the direction logic block 204 selects either an up counter 205 or a down counter 206. Each time one of the two het waveforms toggles, a signal is provided by the OR gate 207 and the selected counter is incremented by one. Thus up counter 205 adds up all the transitions in the positive direction, and down counter 206 adds up all the transitions in the negative direction. When the gyro output is sampled, the difference between the numbers stored in the two counters represents the rotation angle traversed by the gyro. This processing scheme described above yields a digital word that is representative of the gyro rotation.

FIG. 8 also includes a block diagram of turnaround correction circuitry that may be included in the present invention. A logic block 209 receives the outputs of the digitizers 202 and 203 the current direction data from the direction logic circuit 204. The het transition signal provided by the OR gate 207 initiates the turn around logic cycle shown in the flow charts of FIGS. 13A, 13B, 14A and 14B. The logic circuit 209 then controls a pair of timers 210 and 211. The functions implemented include a count enable and a reset for both timers 210 and 211. When a turnaround is deemed complete, the logic and control circuit 209 issues a latch command to the data latches 212. The contents of both timers, the timer select discrete, the turn around direction indicator and the outgoing quadrant bits are all latched in the hardware. The latch command issued by the logic block 209 also serves as a data ready input to a microprocessor, which subsequently reads the latched data.

FIG. 8 also includes a circuit for extracting the backscatter magnitude and phase from the light beams in the gyro. Signals indicative of the clockwise (CW) and counterclockwise (CCW) beam intensities are summed together by a summing circuit 240. The sum of the intensity signals is filtered through a high pass filter 242 to yield and AC intensity sum signal. The AC intensity sum signal carries the backscatter magnitude and phase information. The output of the filter 242 is input to a pair of multiplying circuits 244 and 246, which receive the Het A and Het B signals, respectively. Using the quadrature signals Het A and Het B as references, the circuitry implements two demodulations. The outputs of the multiplying circuits 244 and 246 are input to a pair of low pass filters 248 and 250, respectively. The demodulated signals output from the filters 248 and 250 are then input to the computer.

Figure 9:
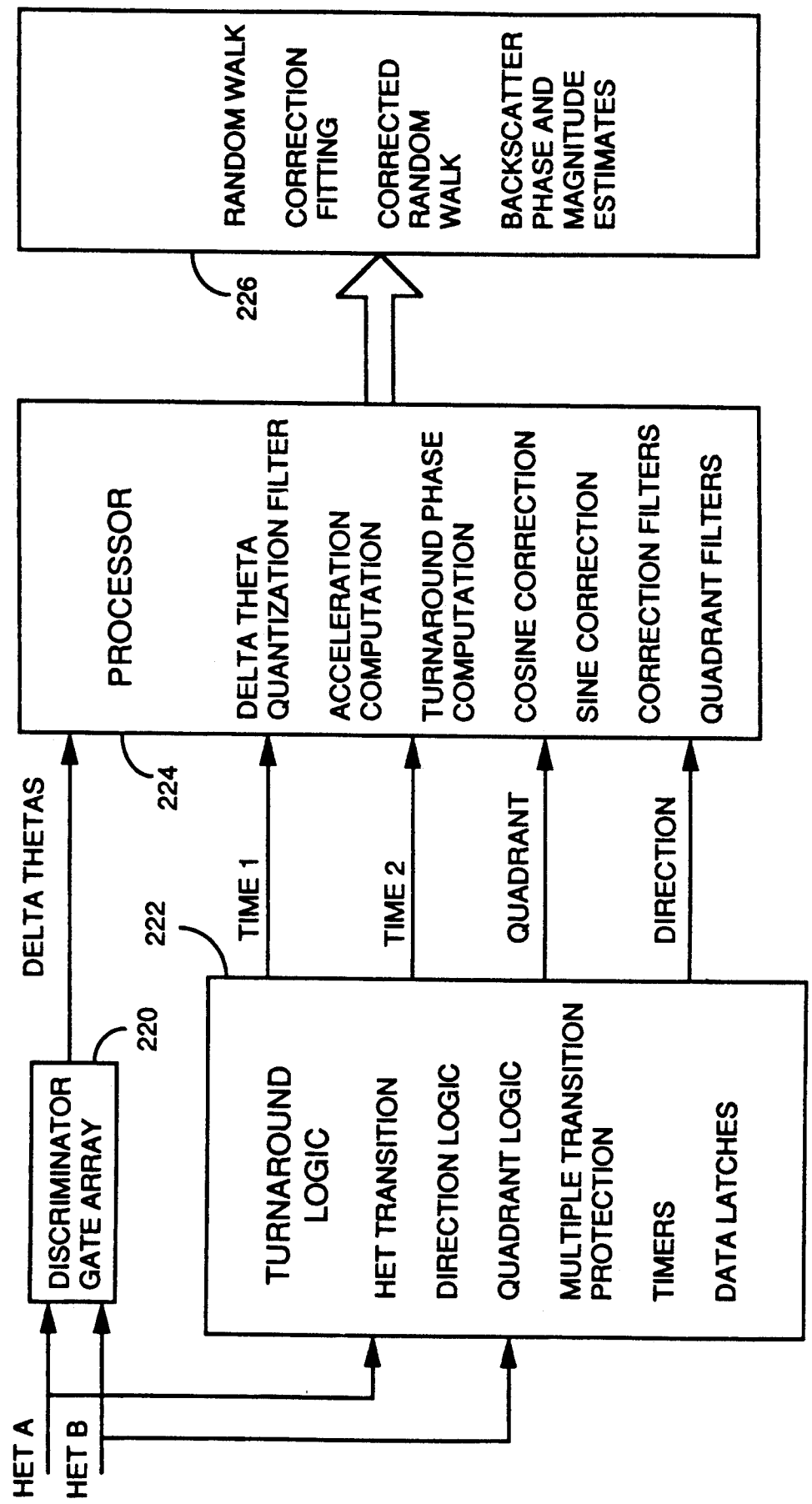
FIG. 9 is a block diagram of signal processing apparatus that may be used to process the signals produced by the circuitry of FIG. 8 to determine the rotation rate and turnaround error correction.

Referring to FIG. 9, the signals het A and het B are input to a discriminator gate array 220 and to a turnaround logic computation device 222. The turn around logic device 222 determines transitions in the het signals and includes direction logic, quadrant logic, multiple transition protection, timers and data latches.

The logic circuit 220 provides signals indicative of the phase increment of the het signals to a processing unit 224. The processing unit 224 also includes means for computing acceleration, turnaround phase, a cosine correction term and a sine correction term. The processing unit 224 includes means for filtering the het phase information, correction filters and quadrant counters. The processing unit 224 is connected to a host computer 226, which is programmed to determine the random walk, correction fitting, corrected random walk and backscatter phase and magnitude estimates.

The phase correction for heterodyne phase detected from the ring laser gyro is given by:

$$\delta\psi = -D\sqrt{\frac{2\pi}{|\alpha_o|}} \sin\left(\psi_o + \phi \pm \frac{\pi}{4}\right), \quad (1)$$

where
 D = Backscatter Magnitude
 $\alpha_o$ = Het Phase Acceleration at Turnaround
 $\psi_o$ = Het Phase at Turnaround
 $\phi$ = Backscatter Phase The positive sign for the $\pm\pi/4$ term is used for clockwise (CW) to counterclockwise (CCW) turn-arounds, and the negative sign is used for CCW to CW turnarounds.

The present invention comprises a method of forming the correction by deriving the backscatter magnitude D and the backscatter phase $\phi$ from analog circuitry and then combining these with the high speed turnaround data to yield a correction. The correction is then summed down to a lower rate and subtracted from the gyro counts to provide an accurate measurement of the ring laser gyro phase.

One approach of the present invention consists of decoupling the analog derived values from the high speed values. This is done simply by expanding the term $\sin(\psi_o + \phi \pm \pi/4)$ from Eq. (1) to get:

$$\delta\psi = -(D\cos\phi)\sqrt{\frac{2\pi}{|a_o|}} \sin\left(\psi_o \pm \frac{\pi}{4}\right) - \quad (2)$$

$$(D\sin\phi)\sqrt{\frac{2\pi}{|a_o|}} \cos\left(\psi_o \pm \frac{\pi}{4}\right).$$

From Eq. (2) the terms $$\sqrt{\frac{2\pi}{|a_o|}} \sin\left(\psi_o \pm \frac{\pi}{4}\right) \text{ and } \sqrt{\frac{2\pi}{|a_o|}} \cos\left(\psi_o \pm \frac{\pi}{4}\right)$$

may be computed and accumulated at high rate. The backscatter parameters $D \cos \phi$ and $D \sin \phi$ can then be factored in as weighting coefficients at a low rate to from the actual correction.

Figure 10A:
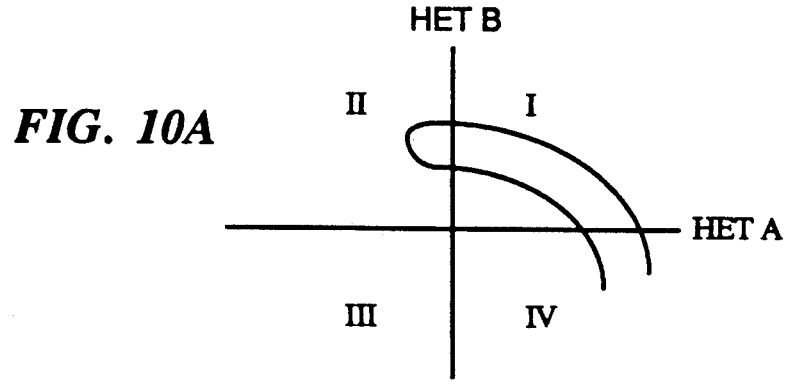
FIG. 10A is a phase space representation of the trajectory of the gyro phase of a ring laser gyroscope near turnaround.
Figure 10B:
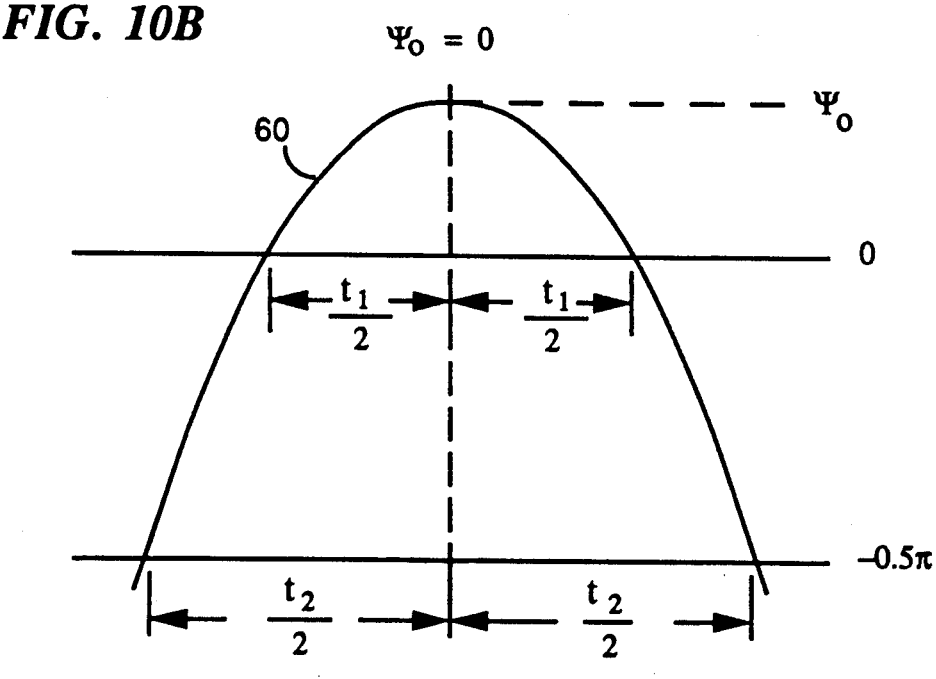
FIG. 10B represents the phase of the heterodyne signals of FIG. 10A as a function of time near a turnaround.

Referring to FIGS. 10A and 10B, the turnaround phase and acceleration can be estimated to a high degree of accuracy by simply using two timers that measure the appropriate intervals of a detected heterodyne signal. At turnaround, the heterodyne signal velocity is, by definition, zero. Thus, in the vicinity of turnaround, the heterodyne phase may be accurately modeled as a parabola 60 described by the equation:

$$\psi(t) = \psi_o + \tfrac{1}{2} a_o (t - t_o)^2, \quad (3)$$

where $t_o$ is the time of turnaround and $\psi_o$ is the phase at turnaround. FIGS. 10A and 10B illustrate a centered interval approach to the phase and acceleration estimates. This method is superior to a one sided approach used previously because it tends to average out the asymmetries due to higher order terms.

One of the problems in the phase estimation consists of the reconstruction of quadrant information. The parabolic approximation only yields the penetration depth into the turnaround quadrant. This quadrant can be determined by recording the state of the heterodyne signals during the turnaround interval. Further logic would then be required to determine the turnaround phase based on penetration phase, quadrant, and turnaround direction.

The present invention provides an alternative scheme wherein the outgoing quadrant is used. The variables of interest are:

$$\psi'_o = \psi_o + (\pi/4) \quad (4)$$

for CW to CCW turn-arounds, and $$\psi'_o = \psi_o - (\pi/4) \quad (5)$$

for CCW to CW turn-arounds, where $\psi_o$ is the heterodyne phase at turnaround. If the outgoing quadrant is used then:

$$\psi'_o = \tfrac{1}{8} a_o t_1^2 + \frac{\pi Q_o}{2} + \frac{\pi}{4} \quad (6)$$

irrespective of the turnaround direction.

Figure 11A:
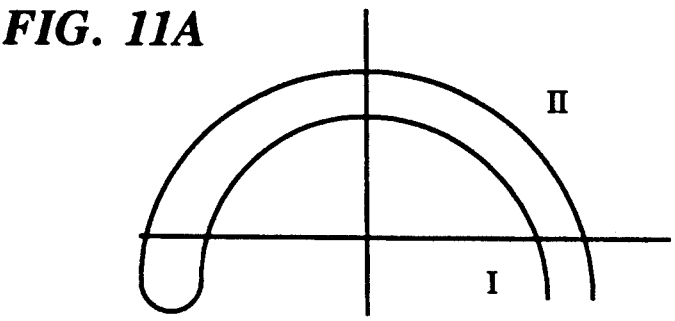
FIG. 11A is a phase space representation of a single heterodyne signal that may be output from the ring laser gyroscope of FIG. 1.
Figure 11B:
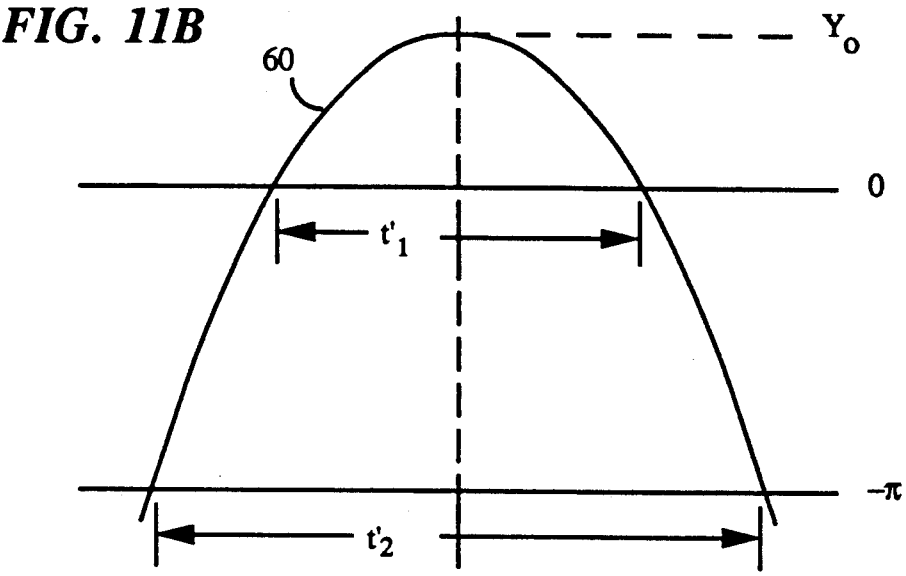
FIG. 11B represents the phase of the heterodyne signal of FIG. 11A as a function of time near a turnaround.
Figure 12:
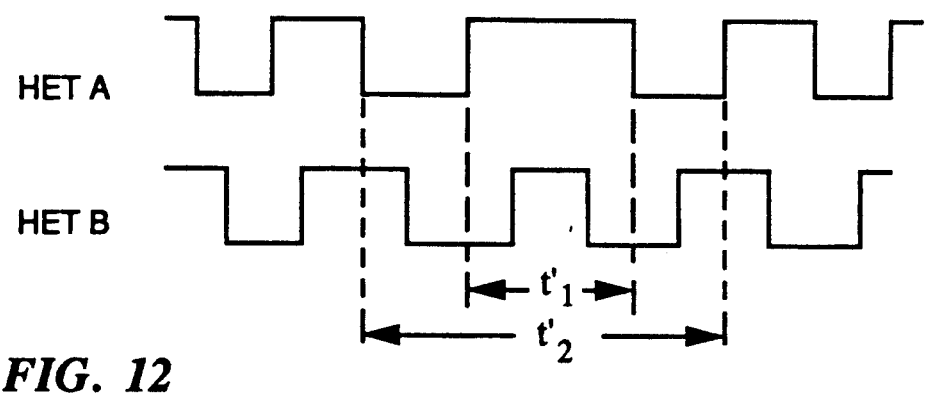
FIG. 12 illustrates digitized heterodyne signals that may be formed from the analog signals of FIG. 6 that are output from the ring laser gyroscope of FIG. 1.

Although the approach described above uses quadrants and semicircles in phase space, an equally valid technique can be implemented using a single heterodyne signal that defines semicircles and circles. FIGS. 11A, 11B and 12 illustrate the single heterodyne technique for determining the turnaround time. The line for HET B is included in FIG. 12 because two heterodyne signals are used to determine the direction of rotation.

Figure 13A:
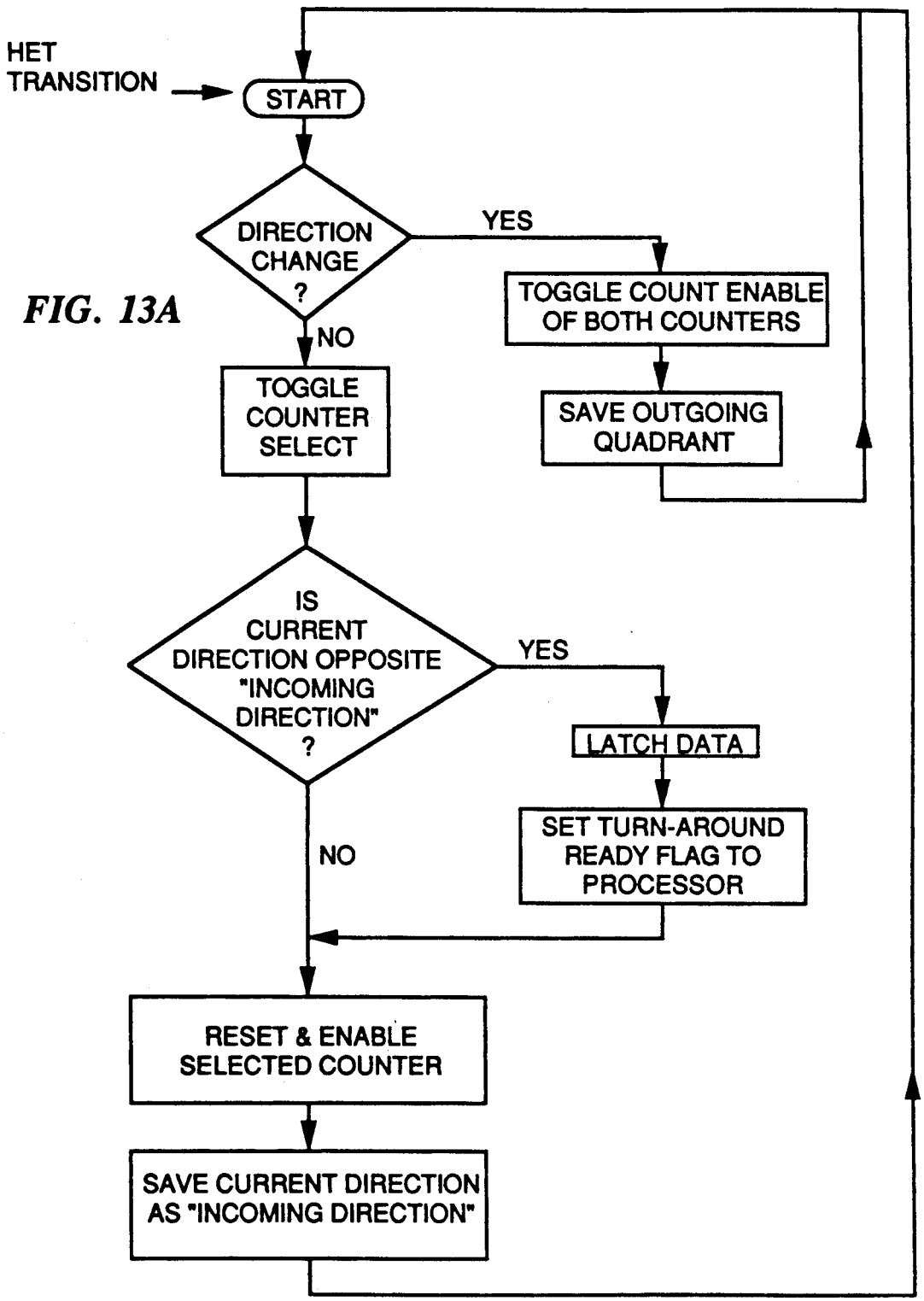
FIG. 13A illustrates the turnaround logic flow chart for a first embodiment of the present invention.
Figure 14A:
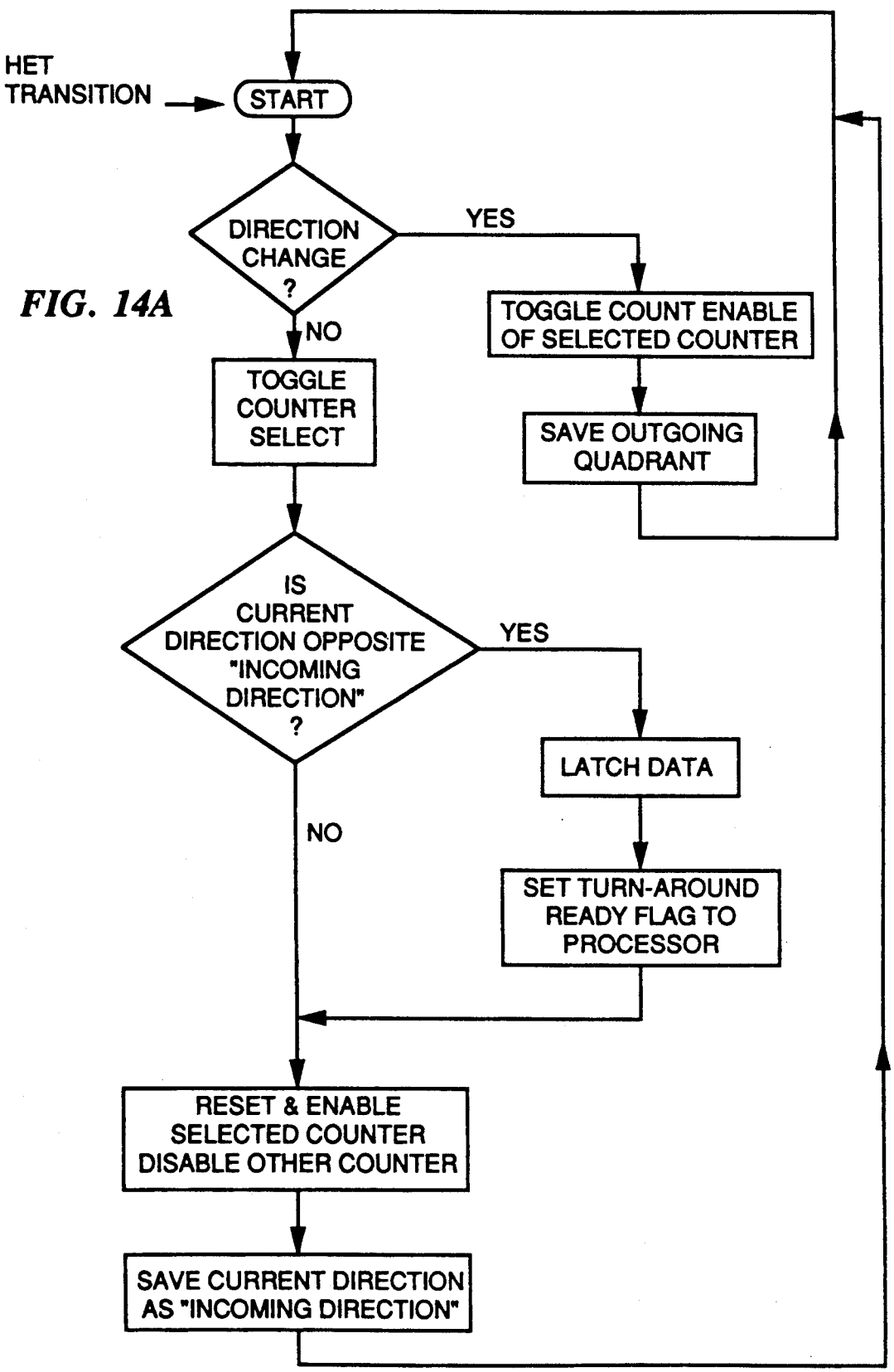
FIG. 14A illustrates the turnaround logic flow chart for a second embodiment of the present invention.

A digital design that incorporates the necessary logic and timer functions may be programmed into three programmable array logic units. The necessary logic and timer functions comprise logic for determining the quadrant being analyzed, the turnaround direction, and two timers. The timers are used to count $t_1$ and $t_2$ of FIG. 10B. A flow chart of suitable logic is provided in FIG. 13A, and an equivalent algorithm is shown in FIG. 13B. The logic is designed to be protected against noise induced heterodyne transitions that would otherwise appear as very rapid turnarounds.

The integer algorithm of the present invention receives the outputs from the hardware. For example, two timer/counter outputs, incoming quadrant bits and turnaround direction bit are recorded by the processor. The algorithm computations include the following steps:

(1) Construct $t_2^2 - t_1^2$ and use it as an index to a look-up table that provides turnaround acceleration $|a_o|$ and the inverse square root of this acceleration $$\frac{1}{\sqrt{|a_o|}}$$

(2) Combine the acceleration $|a_o|$ and $t_1^2$ to form the penetration phase $\tfrac{1}{8}|a_o|t_1^2$.
(3) Use the penetration phase as an index into a cosine/sine look-up table.
(4) Correct the sine term for negative acceleration if required (as indicated by the turnaround direction).
(5) Restore quadrant information using the 2 bit outgoing quadrant identifier and multiply the cosine and sine by $$\frac{1}{\sqrt{|a_o|}}$$

The results are then:

$$C = \frac{1}{\sqrt{|a_o|}} \cos\left(\psi'_o - \frac{\pi}{4}\right) \quad (7)$$

$$S = \frac{1}{\sqrt{|a_o|}} \sin\left(\psi'_o - \frac{\pi}{4}\right) \quad (8)$$

(6) Sum down these terms to a lower rate $$\Sigma C = \Sigma C + C; \text{ and} \quad (9)$$

$$\Sigma S = \Sigma S + S. \quad (10)$$

At the lower rate, the $\pi/4$ phase will be taken into account, then the weighting coefficients $D \cos \phi$ and $D \sin \phi$ are factored in. Thus, the correction is:

$$\delta\psi = -\sqrt{\pi} \; [(D\cos\phi)(\Sigma C + \Sigma S) + (D\sin\phi)(\Sigma C - \Sigma S)]. \quad (11)$$

This correction is then subtracted from the gyro counts at the low rate.

The separation of the high speed processing from the low rate computations facilitates an evaluation of the turnaround correction's performance limits and of the effectiveness of the analog circuitry used. By forming $\Sigma C$ and $\Sigma S$ as previously discussed, the coefficients (D cos $\phi$) and (D sin $\phi$) may be fit to yield minimum random walk. This highlights the possible improvement in random walk and also provides a means of calibrating the analog circuitry.

The present invention comprises an alternative scheme hereafter wherein the costly portion of the high speed turnaround processing has been eliminated through the use of a PROM (Programmable Read Only Memory). This approach basically reduces the computational load at a cost of additional memory. The hardware approach is viewed as a good candidate for system implementation since high speed code, the alternative, is extremely costly in system computers.

The values required at high speed (i.e., at every turnaround) are the following:

$$C = \frac{1}{\sqrt{|\alpha_o|}} \cos\psi'_o \quad (12)$$

$$S = \frac{1}{\sqrt{|\alpha_o|}} \sin\psi'_o \quad (13)$$

Where $\psi_o' = \psi_o + (\pi/4)$ for CW to CCW turnarounds, $\psi_o' = \psi_o - (\pi/4)$ for CCW to CW turnarounds, $\psi_o$ is the heterodyne phase at turnaround and $\alpha_o$ is the heterodyne phase acceleration at turnaround.

The present invention uses the intervals $t_1$ and $t_2$, from FIG. 10A and 10B to provide an index into a two dimensional look-up table. This avoids the multiplications and shifts otherwise required in the software.

The values extracted from the look-up table are as follows:

$$C = \frac{1}{\sqrt{|\alpha_o|}} \text{Cos}\psi'_o \quad (14)$$

$$S = \frac{1}{\sqrt{|\alpha_o|}} \text{Sin}\psi'_o \quad (15)$$

Bounds may be placed on the values of $t_1$ and $t_2$ based on limits set for $\psi_o$ and $|\alpha_o|$.

However, the range for $t_2-t_1$ is more restricted than that for $t_2$ alone. Further, the terms C and S behave more linearly as a function of $t_2-t_1$. Thus, the indices used for the look-up table are chosen to be $t_1$ and $t_2-t_1$. A flow chart of suitable logic is presented in FIG. 14A, and the equivalent algorithm appears in FIG. 14B.

A 6 bit by 6 bit look-up table may be used with this second mechanization of the invention. Such a table requires 8192 bytes of memory to accommodate all of the required Cosine and Sine values in 8 bit precision. Based on a 20 MHz clock, the index ranges and steps preferably are:

$t_1:2^6=64$ steps of 3.2 $\mu$sec each with a range $=0$ to 201.6 usec $t_2-t_1:2^6=64$ steps of 1.6 usec each with a 19.2 $\mu$sec offset and range $=19.2$ usec to 120 usec The $t_1$ and $t_2-t_1$ counters provide an address into a PROM.

One difficulty encountered in this scheme is that the two hardware timers switch roles. Thus, $t_1$ is sometimes represented by the first counter and at other times by the second counter (the same, of course, applies to $t_2-t_1$). The information can be properly reconstituted using the timer select bit along with a set of tri-state latches.

The present invention does not require the multiplications and logic shifts of previous mechanizations. The computer in the present invention simply uses the index provided by the hardware as an address into a look-up table. Alternatively, the hardware could directly address the PROM and the computer simply read the addressed values. This latter solution may be slightly more difficult to implement in a system where the same PROM must be used for all three gyros.

The tasks still required of the computer include the sign and quadrant reconstruction. However, with the proper use of indirect branching, this procedure will have minimal duty cycle impact.

The design of the digital heterodyne phase measurement assumes that the two heterodyne detectors 50A and 50B of FIG. 2 are in phase quadrature. However, because of tolerances in a detector diode and prism alignment, the phase relationship may be in error by as much as $\pm 10°$. However, this error may be calibrated in real time. Since a random excitation is present in the dither signal, gyro turnarounds should be randomly distributed over the four quadrants. By counting the number of turnarounds occurring in each quadrant over a sufficiently long period of time, it should be possible to determine the heterodyne alignment error.

With the alignment error known, it is then possible to make adjustments to the turnaround correction data. In the software this consists of adjusting the acceleration and phase measurements appropriately. Alternatively, the single heterodyne configuration illustrated in FIGS. 11A and 11B can be used to avoid the orthogonality problem at the cost of longer lookup tables.

The approach discussed above employs the gyro intensity signal to provide the backscatter magnitude and phase information. This method is effective but requires costly analog multiplication hardware. An alternative approach is one which makes use of the turnaround phase distribution to extract the backscatter values.

With secondary dither the gyro turnarounds should be ideally uniformly distributed from 0 to $2\pi$. However, with lock-in, the gyro tends to drift toward the lock-in phase. This tendency to drift skews the turn-around distribution toward the lock-in phase. The amount of deviation from a uniform distribution indicates the strength of the lock-in.

Referring again to Equation (2), which is the trigonometric expansion of the sine of the sum of the angles, consider applying a perturbation $\delta\psi$ such that the turnaround phase is $$\psi_o' \approx \psi_o + \delta\psi. \quad (16)$$

The sine of the phase at turnaround is then $$\sin \psi_o' \approx \sin (\psi_o + \delta\psi). \quad (17)$$

Expanding the right side of Eq. (18) yields $$\begin{aligned}\sin(\psi_o + \delta\psi) &= \sin\psi_o \cos\delta\psi + \cos\psi_o \sin\delta\psi & (18)\\ &\approx \sin\psi_o + \delta\psi\cos\psi_o & (19)\\ &\approx \sin\psi_o - \frac{D}{\sqrt{|\alpha_o|}} \sin\left(\psi_o + \phi \pm \frac{\pi}{4}\right)\cos\psi_o & (20)\end{aligned}$$

Since $\psi_0$ is random, the average DC value of the sine of the phase has a value given by $$<\sin\psi'_o> \approx -\frac{D}{\sqrt{|a_o|}} \sin\left(\phi \pm \frac{\pi}{4}\right). \tag{21}$$

Similarly the cosine of the phase is given by $$\begin{aligned}<\cos\psi'_o> &\approx \cos(\psi_O + \delta\psi) \\ &= \cos\psi_o \cos\delta\psi - \sin\psi_o \sin\delta\psi \\ &\approx \cos\psi_o - \delta\psi \sin\psi_o \\ &\approx \cos\psi_o + \frac{D}{\sqrt{|a_o|}} \sin\left(\psi_o + \phi \pm \frac{\pi}{4}\right)\sin\psi_o\end{aligned} \tag{22,23}$$

Again with random $\psi_o$, the cosine of the phase error has a DC value of $$\cos\psi'_o \approx +\frac{D}{\sqrt{|a_o|}} \cos\left(\phi \pm \frac{\pi}{4}\right). \tag{24}$$

Therefore, by separating the turnarounds according to direction, it is possible to observe $$\frac{D}{\sqrt{|a_o|}} \cos\phi \text{ and } \frac{D}{\sqrt{|a_o|}} \sin\phi.$$

Therefore, the determination of the backscatter magnitude, D, and the backscatter phase, $\phi$, is possible using only the het signals. The requirements for this approach include the necessity for a very accurate and symmetric het digitizer and an accurate correction computation algorithm. This approach to correcting for turnaround errors eliminates the noise critical and costly analog circuitry required to demodulate the intensity signal.

The above shows one possible method of determining the backscatter parameters by averaging the correction values. It is also possible to observe the turnaround phase distribution and deduce the lock-in phase and magnitude from its shape.

Since the phase error at turnaround is given by $$\delta\psi = -D\sqrt{\frac{2\pi}{|a_o|}} \sin\left(\psi_o + \phi \pm \frac{\pi}{4}\right), \tag{25}$$

the actual turnaround phase is $$\psi_T = \psi + \delta\psi = \psi - D\sqrt{\frac{2\pi}{|a_o|}} \sin\left(\psi_o + \phi \pm \frac{\pi}{4}\right). \tag{26}$$

where $\psi$ is a random variable due to secondary dither and $\psi_T$ is the observed turnaround phase. The distribution function can then be determined by counting the number of turnarounds that occur between $$n\Delta\psi \leq \psi_T < (n+1)\Delta\psi \tag{27}$$

The distribution function thus obtained is then fit against the model given in equation (25). The backscatter parameters D and $\phi$ are the outputs of the fit routine. They are then used in conjunction with the high speed correction data to perform the turnaround compensation.

The fully digital mechanization of the turnaround correction system utilizes measurements of turnaround phase and acceleration. No direct measurements of the backscatter parameters are made. Instead, the distribution of the turnaround phase angle over many reversals is used to estimate the lock-in rate and phase.

What is claimed is:

1. A system for compensating for turnaround phase errors in measurements of rotations with a dithered ring laser gyroscope that includes a frame having a cavity therein for guiding a pair of counterpropagating light beams and means for producing a pair of heterodyne signals that are processed to determine an angle of rotation, comprising:
    means for determining the direction of rotation of the frame;
    means for detecting turnarounds in direction of rotation of the frame;
    means for determining the heterodyne phase at turnaround;
    means for determining the heterodyne phase acceleration at turnaround;
    means for determining the amplitude of backscattered light in the cavity;
    means for determining the phase of backscattered light in the cavity; and
    means for calculating a phase correction to compensate for turnaround-induced errors in measurements of phase differences between the two beams as a function of the heterodyne phase and acceleration at turnaround and as a function of the amplitude and phase of the backscattered light in the cavity.

2. The system of claim 1, further comprising:
    means for detecting the heterodyne signals produced by the two counterpropagating light beams within the ring laser gyroscope; and
    means for sampling the detected heterodyne signals at a selected rate.

3. The system of claim 1, further comprising:
    means for detecting a transition in the heterodyne signal to indicate a change in the direction of rotation, the transition triggering the start of a turnaround measuring cycle; and
    means for determining if a currently measured heterodyne signal is opposite in direction from an incoming heterodyne signal.

4. The system of claim 3, further comprising:
    means for representing a heterodyne phase as a parabola divided into a turnaround quadrant and a semicircle;
    means for measuring a first time period in the quadrant;
    means for measuring a second time period in the semicircle;
    means for calculating the phase error introduced at each turnaround as a function of the first and second time periods.

5. The system of claim 4 wherein the direction change detecting means further comprises:
    first and second counting means, each counting means having an enable;
    means for toggling the enable of the first and second counting means if a change in direction has been detected, the counting means detecting a first and a second time period;

means for saving the output quadrant of the parabola when a change in direction has been detected; and means for returning to the transition detecting means after the outgoing quadrant of the parabola has been saved.

6. The system of claim 5 wherein the direction change detecting means further comprises means for selecting a counting means and means for toggling the counter selecting means if there is no change in the direction of rotation.

7. The system of claim 4 wherein the opposite direction detecting means further comprises:

means for latching the first time period and the second time period if the direction of the incoming heterodyne signal is opposite that of the currently measured heterodyne; and means for signalling the processor that data has been latched if the incoming direction is opposite the current direction.

8. The system of claim 7 wherein the means for determining whether the direction of the incoming heterodyne signal is opposite the current heterodyne signal direction further comprises:

a plurality of counters;

means for resetting and enabling selected counters and means for disabling counters not selected by the counter selecting means if the incoming direction is opposite the current direction or the processor has been signalled to latch data;

means for saving a signal indicative of the current direction as "incoming direction"; and means for returning to the means for determining a transition in the heterodyne signal.

9. The system of claim 3, further comprising:

means for representing a heterodyne phase as a parabola divided into a turnaround semicircle and a circle;

means for measuring a first time period in the semicircle;

means for measuring a second time period in the circle; and means for calculating the phase error introduced at each turnaround as a function of the first and second time periods.

10. The system of claim 1, further comprising:

means for representing a heterodyne phase as a parabola divided into a turnaround quadrant and a semicircle;

means for measuring a first time period in the quadrant; and means for measuring a second time period in the semicircle;

an indexed look-up table that provides turnaround acceleration measurements and the inverse square root of the turnaround acceleration measurements;

a cosine/sine look-up table;

a outgoing quadrant identifier;

means for constructing the square of the second time period minus the square of the first time period and using this value to index the look-up table that provides turnaround acceleration and inverse square root acceleration measurements;

means for combining the turnaround acceleration and the square of the first time period, $t_1^2$, to form a penetration phase equal to $\frac{1}{2}(\alpha_o)t_1^2$;

means for using the penetration phase as an index to the cosine/sine look-up table;

means for negating the sine term for negative acceleration if required as indicated by the turnaround direction;

means for restoring the quadrant information using the two-bit outgoing quadrant identifier and subsequently forming $$C = \frac{1}{\sqrt[4]{|\alpha_o|}} \cos\left(\psi - \frac{\pi}{4}\right)$$

and $$S = \frac{1}{\sqrt[4]{|\alpha_o|}} \sin\left(\psi - \frac{\pi}{4}\right)$$

means for summing down to a lower rate where $\Sigma C = \Sigma C + C$ and $\Sigma S = \Sigma S + S$ so that the phase correction $\delta\psi$ is $$\delta\psi = -\frac{1}{\sqrt{\pi}}[(D\cos\phi)(\Sigma C + \Sigma S) + (D\sin\phi)(\Sigma C - \Sigma S)];$$

and means for subtracting the phase correction $\delta\psi$ from the gyroscope count at the low rate to provide turnaround phase correction.

11. A method for determining the heterodyne phase and acceleration at turnaround in a body dithered ring laser gyroscope by using the digitized heterodyne signal therefrom, the determined signals being used to calculate the turnaround phase correction to be added or subtracted from the detected ring laser gyroscope phase, comprising the steps of:

determining the direction of rotation of the frame;

detecting turnarounds in direction of rotation of the frame;

determining the heterodyne phase at turnaround;

determining the heterodyne phase acceleration at turnaround;

determining the amplitude of backscattered light in the cavity;

determining the phase of backscattered light in the cavity; and calculating a phase correction to compensate for turnaround-induced errors in measurements of phase differences between the two beams as a function of the backscattered light amplitude, and the phase of backscattered light, the heterodyne phase acceleration at turnaround, and the heterodyne phase at turnaround.

12. The method of claim 11, further comprising the steps of:

detecting the heterodyne signals produced by the two counterpropagating light beams within the ring laser gyroscope; and sampling the detected heterodyne signals at an appropriate rate, the sampling means may be a counter.

13. The method of claim 11 wherein the heterodyne phase and acceleration determining step further comprises the steps of:

detecting a transition in a heterodyne signal, the transition triggering the start of a turnaround measuring cycle;

detecting a change in direction of the dithering ring laser gyroscope; and determining if a currently measured heterodyne signal is opposite in direction from an incoming heterodyne signal.

14. The method of claim 13, further comprising the steps of:
representing a digitized heterodyne signal as a parabola and dividing it into a quadrant and a semicircle;
measuring a first time period in the quadrant; and
measuring a second time period in the semicircle.

15. The method of claim 14 wherein the direction change detecting step further comprises the steps of:
providing a first and second counting means each having an enable;
toggling the enable of the first and second counting means if a change in direction has been detected, the counting means detecting a first and a second time period;
saving the output quadrant of the parabola when a change in direction has been detected; and
returning to the transition detecting means after the outgoing quadrant of the parabola has been saved.

16. The method of claim 14, further comprising the steps of:
latching the difference between the first and second time periods if the direction of the incoming heterodyne signal is opposite that of the currently measured heterodyne signal; and
signalling the processor that data has been latched if the incoming direction is opposite the current direction.

17. The method of claim 16 wherein the step of determining whether the direction of the incoming heterodyne signal is opposite the current heterodyne signal direction further comprises the step of:
providing a plurality of counters;
resetting and enabling selected counters;
disabling counters not selected if the incoming direction is opposite the current direction or the processor has been signaled to latch data;
saving the current direction as "incoming direction" after the above means has occurred; and
returning to the means for determining a transition in the heterodyne signal.

18. The method of claim 11 wherein the phase correction step further comprises the steps of:
representing a digitized heterodyne signal as a parabola and dividing it into a quadrant and a semicircle;
measuring a first time period in the quadrant; and
measuring a second time period in the semicircle;
providing an indexed look-up table that provides turnaround acceleration measurements and the inverse square root of the turnaround acceleration measurements;
providing a cosine/sine look-up table;
providing a outgoing quadrant identifier;
constructing the square of the second time period minus the square of the first time period and using this value to index the look-up table that provides turnaround acceleration and inverse square root acceleration measurements;
combining the turnaround acceleration and the square of the first time period, $t_1^2$, to form a penetration phase equal to $\frac{1}{2}a_o t_1^2$;
using the penetration phases an index to the cosine/sine look-up table;
correcting the sine term for negative acceleration if required;
restoring the quadrant information using the two-bit outgoing quadrant identifier and the cosine and sine terms multiplied by the inverse root of the turnaround acceleration with equations $$C = \frac{1}{\sqrt{|a_o|}} \cos\left(\psi \pm \frac{\pi}{4}\right)$$

and $$S = \frac{1}{\sqrt{|a_o|}} \sin\left(\psi \pm \frac{\pi}{4}\right)$$

summing down to a lower rate where $\Sigma C = \Sigma C + C$ and $\Sigma S = \Sigma S + S$ so that the phase correction $\delta\psi$ is $$\delta\psi = -\frac{1}{\sqrt{\pi}}[(D\cos\phi)(\Sigma C + \Sigma S) + (D\sin\phi)(\Sigma C - \Sigma S)];$$

and;
subtracting $\delta\psi$ from the gyroscope count at the low rate to provide turnaround phase correction.

19. A system for compensating for turnaround phase errors in measurements of rotations with a dithered ring laser gyroscope that includes a frame having a cavity therein for guiding a pair of counterpropagating light beams and means for producing a pair of heterodyne signals that are processed to determine an angle of rotation, comprising:
means for detecting turnarounds in the direction of rotation of the frame and determining a phase distribution for the detected turnarounds;
means for processing the phase distributions of the heterodyne signals for a multiplicity of turnarounds in the direction of rotation of the frame to determine the angle towards which the phase distributions are skewed and the amount of the skew;
means for calculating a phase correction to compensate for turnaround-induced errors in measurements of phase differences between the two beams as a function of the skew angle and the amount of skew of the phase distribution.

20. The system of claim 19, further including:
means for digitizing the heterodyne signals;
means for measuring the times between positive and negative transitions in the heterodyne signals;
means for dividing the 0°–360° range of possible turnaround angles into a predetermined number of angular intervals; and
counting the number of turnarounds that occur in each interval.

21. A method for compensating for turnaround phase errors in measurements of rotations with a dithered ring laser gyroscope that includes a frame having a cavity therein for guiding a pair of counterpropagating light beams and means for producing a pair of heterodyne signals that are processed to determine an angle of rotation, comprising the steps of:
detecting turnarounds in the direction of rotation of the frame;
determining a phase distribution for the detected turnarounds;
processing the phase distributions of the heterodyne signals for a multiplicity of turnarounds in the direction of rotation of the frame to determine the angle towards which the phase distributions are skewed and the amount of the skew;

calculating a phase correction to compensate for turnaround-induced errors in measurements of phase differences between the two beams as a function of the skew angle and the amount of skew of the phase distribution.

22. The method of claim 19, further including the steps of:

digitizing the heterodyne signals;

measuring the times between positive and negative transitions in the heterodyne signals;

dividing the 0°–360° range of possible turnaround angles into a predetermined number of angular intervals; and counting the number of turnarounds that occur in each interval.

* * * * *